UNITED STATES PATENT OFFICE.

GIOVANNI FROLLO, OF MILAN, ITALY.

IMPERMEABLE CEMENT FOR RESISTING WATER.

No. 849,778.          Specification of Letters Patent.          Patented April 9, 1907.

Application filed December 14, 1906. Serial No. 347,779.

*To all whom it may concern:*

Be it known that I, GIOVANNI FROLLO, a subject of the King of Italy, residing at 7 Via Francesco Melzi, Milan, Italy, have invented new and useful Improvements in Impermeable Cement for Resisting Water, of which the following is a specification.

The impermeable cement for resisting water which forms the object of the present invention is the first of its kind which is able to meet all the purposes cement is intended for.

It consists of the addition to the common ingredients of the following: sulfate of barium, boiled linseed-oil, prepared in the manner specified below.

The ingredients or raw materials required for the new composition are river-quicksand well washed, colophony, sulfate of barium, tailors' chalk, linseed-oil, and water. The qiucksand must be very dry. The colophony and the sulfate of barium must be crushed into fine powder, the linseed-oil of the first quality, boiled, and rendered exsiccative with litharge and with essence of turpentine. The proportions may vary, but must always approach the figures of the following table, which shows the proportions, taking a kilogram of sand as a basis: quicksand, kilogram, 1.000; colophony, kilogram, 0.180; sulfate of barium, kilogram, 0.070; tailors' chalk, kilogram, 0.080; boiled linseed-oil, kilogram, 0.200; water, kilogram, 0.160. Another suitable composition is the following: quicksand, kilogram, 1.000; colophony, kilogram, 0.160; tailors' chalk, kilogram, 0.150; linseed-oil, kilogram, 0.173; water, kilogram, 0.158; marble, kilogram, 0.055; sulfate of zinc, kilogram, 0.012.

The mixture is prepared in the following way: The solid ingredients are to be well mixed together. The requisite quantities of oil and water are then taken and with a specially-adapted instrument mixed together until they assume the aspect of beaten eggs. The solid mixture is then gradually let into the liquid one, and when the whole quantity has been added this new mixture must be worked until a paste similar to ordinary lime is obtained, the whole having a brownish-white appearance. When this operation (which takes from thirty to forty-five minutes, according to the quantities used) is finished, the cement thus obtained must be deposited in tins, which must be hermetically sealed.

What I claim as my invention, and desire to secure by Letters Patent, is—

1. A process for the manufacture of impermeable cement for resisting water characterized in that a mixture of liquid ingredients and a mixture of solid ingredients are required for the formation of the cement, said mixtures being composed of linseed-oil and water as liquid ingredients and of quicksand, colophony, tailors' chalk, marble and sulfate of zinc as solid ingredients substantially as described and for the purpose set forth.

2. As an article of manufacture, a cement composed of quicksand, colophony, tailors' chalk, linseed-oil, water, marble, sulfate of zinc.

In testimony whereof I have hereunto set my hand in the presence of two subscribing witnesses.

GIOVANNI FROLLO.

Witnesses:
     ERNEST LAUB,
     H. B. GURNEY.